(12) United States Patent
Dennis

(10) Patent No.: US 7,822,562 B2
(45) Date of Patent: Oct. 26, 2010

(54) REMOVING AIR WAVE NOISE FROM ELECTROMAGNETIC SURVEY DATA

(75) Inventor: Willen E. Dennis, Houston, TX (US)

(73) Assignee: ExxonMobil Upstream Research Co., Houston, TX (US)

( * ) Notice: Subject to any disclaimer, the term of this patent is extended or adjusted under 35 U.S.C. 154(b) by 123 days.

(21) Appl. No.: 12/303,948

(22) PCT Filed: May 18, 2007

(86) PCT No.: PCT/US2007/011905

§ 371 (c)(1),
(2), (4) Date: Dec. 8, 2008

(87) PCT Pub. No.: WO2008/008124

PCT Pub. Date: Jan. 17, 2008

(65) Prior Publication Data

US 2010/0163242 A1    Jul. 1, 2010

Related U.S. Application Data

(60) Provisional application No. 60/830,639, filed on Jul. 13, 2006.

(51) Int. Cl.
*G01V 9/00* (2006.01)
*G01V 11/00* (2006.01)

(52) U.S. Cl. ............. 702/38; 702/2; 702/5; 702/7; 702/13; 702/14; 702/16; 702/35; 702/36; 367/128; 324/219; 324/222; 324/334; 324/345; 324/346; 324/347; 324/348; 324/349; 324/350; 324/351; 324/352; 324/353; 324/354; 324/355; 324/356; 324/357; 324/358; 324/359; 324/360; 324/361; 324/362; 324/363; 324/364; 324/365

(58) Field of Classification Search ............. 702/2, 702/5, 7, 14, 16, 13, 36, 38; 324/72, 219, 324/222, 345–365, 334; 367/128
See application file for complete search history.

(56) References Cited

U.S. PATENT DOCUMENTS 7,277,806 B2 * 10/2007 Lu et al. .................. 702/76

FOREIGN PATENT DOCUMENTS

WO    WO 03/100467 A1    12/2003

(Continued)

OTHER PUBLICATIONS

EP Search Report RS 114213 dated Dec. 1, 2006.

(Continued)

*Primary Examiner*—Sujoy K Kundu

(57) ABSTRACT

Method for removing air wave noise from shallow water controlled source electromagnetic survey data, using only the measured data and conductivity values for sea water (140) and air. The method is a calculation performed numerically on CSEM data and resulting in an estimate of those data that would have been acquired had the water layer extended infinitely upward from the seafloor. No properties of the sub-sea sediments are used. Synthetic electromagnetic field data are generated for (a) an all water model (141) and (b) an air-water model (146-147) of the survey region. These simulated results are then used to calculate (148-150) electromagnetic field values corresponding to a water-sediment model with water replacing the air half space, which represent measured data adjusted to remove air wave noise.

13 Claims, 8 Drawing Sheets

FOREIGN PATENT DOCUMENTS

WO    WO 2005/010560 A1    3/2005

OTHER PUBLICATIONS

*PCT International Search & Written Opinion*, dated May 8, 2008 for PCT US2007/11905.
Allen J. et al., (1977) "A Unified Approach to Short-Time Fourier Analysis and Synthesis," *Proc of the IEEE* 65, pp. 1558-1564.
Choi H. et al. (1989), "Improved time-frequency representation of multi-component signals using exponential kernels," *IEEE Trans. on Acoust., Speech and Signal Processing* 37, pp. 862-871.
Constable S. et al., (2006) "Mapping thin resistors and hydrocarbons with marine EM methods: Insights from I-D modeling," *Geophysics*, 71, No. 2, pp. G43-G51.
Guo, Z. et al. (1994), "The time-frequency distributions of nonstationary signals based on a Bessel kernel," *IEEE Trans. on Signal Proc.* 42, pp. 1700-1707.
Lang W.C. et al., (1998) "Time-frequency analysis with the continuous wavelet transform," *Am J. Phys.* 66, pp. 794-797.
Lu, X. et al., (2006), " Marine CSEM Data Processing Techniques," *SEG Publications*, pp. 704-708.
Mittet, R. et al. (2004), "Inversion of SBL Data Acquired in Shallow Waters," paper E020, $66^{th}$ Annual Conference and Exhibition, European Association of Geoscientists and Engineers, Paris.
Morse, P.M. et al. (1953), Methods of Theoretical Physics, McGraw-Hill 2, p. 1770.
Press, W.H. et al. (1992), "Fast Fourier Transform," Numerical Recipes in Fortran, $2^{nd}$ ed., Cambridge University Press, chapter 12.
Ville, J., (1948), "Theorie et aplicationde la notion de signal analytique," *Cables et Transmission* 2A., pp. 61-74.
Wannamaker, P.E. et al. (1984), "Electromagnetic modeling of three-dimensional bodies in layered earths using interal equations," *Geophysics* 49, pp. 60-74.
Ward et al., (1987), "Electromagnetic Theory for Geophysical Applications," *Electromagnetic Methods in Applied Geophysics, v. I*, Nabighian, ed., Society of Exploration Geophysics 1, pp. 138, 181, 203-252.
Wigner E., (1932), The quantum correction for thermodynamic equilibrium, *Phys. Rev.* 40, pp. 749-759.

* cited by examiner

REMOVING AIR WAVE NOISE FROM ELECTROMAGNETIC SURVEY DATA

CROSS-REFERENCE TO RELATED APPLICATIONS

This application is a National Stage entry under 35 U.S.C. 371 of PCT/US2007/0011905 that published as WO 2008/008124 and was filed on May 18, 2007 and claims the benefit of now expired U.S. Provisional application 60/830,639 which was filed on Jul. 13, 2006.

FIELD OF THE INVENTION

This invention relates generally to the field of geophysical prospecting and, more particularly, to electromagnetic surveys for hydrocarbons in a marine environment. Specifically, the invention is a data processing method for suppressing air-wave noise in marine electromagnetic data by determining the data that would have been measured had the air been replaced by water.

BACKGROUND OF THE INVENTION

Controlled-source electromagnetic ("CSEM") surveys are becoming an important geophysical tool for evaluating the presence of hydrocarbon-bearing strata within the earth. CSEM surveys typically record the electromagnetic signal induced in the earth by a source (transmitter) and measured at one or more receivers. The behavior of this signal as a function of transmitter location, frequency, and separation (offset) between transmitter and receiver can be diagnostic of rock properties associated with the presence or absence of hydrocarbons. A notable diagnostic rock property of this kind is electrical resistivity. Thus, CSEM measurements are typically used to determine the spatially-varying resistivity of the subsurface.

In the marine environment, CSEM data are typically acquired by towing an electric dipole transmitting antenna 10 among a number of receivers 11 positioned on the seafloor 12 (FIG. 1). The receivers typically have multiple sensors designed to record different vector components of the electric and/or magnetic fields. The transmitter antenna is typically towed (by a vessel on the sea surface 13) a few tens of meters above the seafloor. The receivers are weighted and fall to the seafloor, but release their weight and rise back to the surface with the data after receiving an acoustic command from the ship. Alternative configurations include stationary transmitters on the seafloor or in the water column as well as magnetic transmitter antennae. The transmitting and receiving systems typically operate independently (without any connection between them), so that receiver data must synchronized with shipboard measurements of transmitter position by comparing clock times on the receivers to time from a shipboard or GPS (Global Positioning System) standard.

CSEM data are typically interpreted in the temporal frequency domain, each signal representing the response of the earth to electromagnetic energy at that temporal frequency. Temporal frequency domain means the data is transformed, typically by Fourier transformation, such that the dependence of the data on time becomes dependence on frequency. In raw data, the strength of each frequency component varies depending on how much energy the transmitter broadcasts (i.e., the amplitude of each component in the transmitter's frequency spectrum) and on the receiver sensitivity at that frequency. These transmitter and receiver effects are typically removed from the data prior to interpretation. FIGS. 2A-B depict raw receiver data 21 together with the transmitter waveform 22 that gave rise to it. FIG. 2A displays measured data on a time scale of several hours while FIG. 2B shows the received signal (and, for reference, the transmitted signal) on a much shorter time scale, comparable to the transmitter signal period, typically between 4 and 32 seconds. (The vertical scale applies only to the receiver signal.)

In practice, the receiver data are usually converted to temporal frequency by dividing (or "binning") the recorded time-domain data into time intervals ($x_1$, $x_2$, and $x_3$ in FIG. 3A) equal to the transmitter waveform period (FIG. 3A) and determining the spectrum within each bin by standard methods based on the Fourier transform (FIG. 3B). (The phases of the spectral components are not shown.) With each bin is associated a time, typically the Julian date at the center of the bin. Since the transmitter location is known as a function of time, these bins may be interchangeably labeled in several different ways: by Julian date of the bin center; by transmitter position; by the signed offset distance between source and receiver; or, by the cumulative distance traveled by the transmitter relative to some arbitrarily chosen starting point. In general, the received signals are made up of components both in-phase and out-of-phase with the transmitter signal. The signals are therefore conveniently represented as complex numbers in either rectangular (real-imaginary) or polar (amplitude-phase) form. The transmitter signal may be a more complex waveform than that depicted in FIGS. 2B and 3A.

Those skilled in the art of digital signal processing will know of techniques that will decompose time series, such as raw CSEM data, to temporal frequency without explicitly dividing the data into non-overlapping time intervals. In general, a time series may be transformed to the time-frequency domain and the dominant temporal frequencies extracted separately as functions of time. Some methods of transforming data to the time-frequency domain include the Short-Time Fourier Transform (J. Allen, L. Rabiner, "A Unified Approach to Short-Time Fourier Analysis and Synthesis," *Proc. of the IEEE* 65, 1558-64, (1977)); the Wavelet Transform (W. C. Lang and K. Forinash, "Time-frequency analysis with the continuous wavelet transform," *Am. J. Phys.* 66, 794-797, (1998)); the Wigner-Ville transform (E. Wigner, On the quantum correction for thermodynamic equilibrium, *Phys. Rev.* 40, 749-759, (1932), and J. Ville, "Theorie et application de la notion de signal analytique," *Cables et Transmission*, 2A., 61-74, (1948)); the Choi-Williams transform (H. Choi and W. Williams, "Improved time-frequency representation of multicomponent signals using exponential kernels," *IEEE Trans. on Acoust., Speech, and Signal Processing*, 37, 862-871, (1989)); and the Bessel method (Z. Guo, L. G. Durand, and H. C. Lee, "The time-frequency distributions of nonstationary signals based on a Bessel kernel," *IEEE Trans. on Signal Proc.*, 42, 1700-1707, (1994)). The present invention is not limited to any particular method or methods for spectral decomposition of CSEM data to the temporal frequency domain.

"Skin depth" is a useful concept in many applications of electromagnetism. For a material with conductivity $\sigma$ given in $(\Omega\text{-m})^{-1}$ the skin depth is given by $$\delta = \sqrt{2/(\omega\mu\sigma)}$$

where $\omega$ is the angular frequency in rad/sec and $\mu \approx 4\pi \times 10^{-7}$ H/m is the magnetic permeability. The skin depth is the distance over which a plane electromagnetic wave will decay in amplitude by a factor of $e^{-1}$, where e is the base of the natural logarithmic system (Ward et al., "Electromagnetic Theory for Geophysical Applications," page 138, in *Electromagnetic*

*Methods in Applied Geophysics*, v. 1, Nabighian, ed., Society of Exploration Geophysics (1987)). This loss of amplitude corresponds to a transfer of energy into the material in the form of heat. With no risk of confusion, skin depth can be thought of either as a property of the material and how it responds to electromagnetic waves of different frequencies or as a characteristic of electromagnetic waves and how they propagate in different materials.

Marine CSEM survey data are strongly dependent on the skin depth in water. This dependence is twofold. First, the attenuation in water controls how much electromagnetic energy will be broadcast into the sediments beneath the water. In practical marine CSEM applications, this effect creates a preference for towing the transmitter close to the seafloor. Second, and more importantly for this invention, the attenuation controls how much electromagnetic energy will be broadcast into the air above the water. In particular, if the transmitter is several skin depths below the air-water boundary, the amplitudes broadcast into the air will be weakened by several factors of e. In addition, these signals propagating in the air will be weakened by additional factors of e as they penetrate the water in order to be captured by the receivers. Conversely, if the transmitter and receivers are within one skin depth of the air-water boundary, a significant portion of the measurement will correspond to signals propagating through the air.

Water conductivities typically depend on the amount and type of dissolved chemicals as well as on the temperature. For example, sea water might have conductivities in the range of 1-5 $(\Omega\text{-m})^{-1}$ while potable lake water has conductivities in the range 0.005-0.05 $(\Omega\text{-m})^{-1}$. FIG. 4 shows the dependence of skin depth on conductivity at four different frequencies, from top to bottom: 0.01, 0.1, 1, and 10 Hz. Thus, the skin depth at 1.0 Hz in seawater with conductivity 3.0 $(\Omega\text{-m})^1$ is approximately 290 meters. In the ocean, water conductivities can vary, for example, at river mouths where fresh water mixes with more conductive salt water.

In the following, words such as "seawater", "marine", and "ocean" are used with the understanding that similar observations will apply for fresh water and lakes provided the differences in conductivity are taken into account.

The arrival (at a CSEM receiver) of significant electromagnetic energy through the air can overwhelm the effects of hydrocarbon reservoirs in CSEM data, making it difficult for the CSEM data interpreter to discern the presence or absence of hydrocarbon reservoirs in the subsurface. The source of the problem is twofold. Firstly, energy traveling through the air can be very strong since there is little attenuation of the electromagnetic waves in air (the skin depth is very long). Secondly, both air and hydrocarbon-bearing strata can give rise to similar features in CSEM data, since both materials are generally much more resistive than other earth strata. Since the earth's atmosphere is always present during CSEM data acquisition, all CSEM data will contain signals that arise because of the presence of the air. Such components of the CSEM signal may be referred to as "air waves" or "air-wave noise". This definition of air-wave noise includes signals that arise because of refractions at the air-water interfaces and wave-guide effects in the water column as well as signals that literally follow paths through the air. In general, CSEM receivers record signals that have reflected one or more times within the air-water-sediment system. So, in addition to recording signals that have reflected from the air layer and signals that have reflected from the subsea sediments, the data will include signals that first reflected from the air and were subsequently reflected from subsea strata of interest before arriving at the receiver. While such multiply-reflected signals do contain some information about subsea strata, they are dominated by the reflection from the air layer and the electrical properties of air and are therefore considered noise in most CSEM surveys. As described above, air-wave noise is substantially decreased when the seawater is several skin depths thick, since the electromagnetic energy will be strongly attenuated as it travels to and from the air layer. Conversely, the level of air-wave noise increases as the water becomes more shallow, being particularly onerous when the water thickness is two skin depths or less.

FIGS. 5 and 6 serve to illustrate the impact of air-wave noise on hydrocarbon exploration using CSEM data. FIG. 5 shows synthetic (i.e., from model calculations) CSEM electric field amplitudes from two resistivity models in which the seawater is represented by an infinite half space above the seafloor. The solid line 52 corresponds to a model containing a reservoir at 2 km below the seafloor and the dashed line 54 corresponds to a model in which the reservoir is absent. The phases of the data are not shown. In these examples, the frequency and non-reservoir resistivities are such that the effect of the reservoir becomes apparent at offsets greater than about 4 km. Of course, actual data may be partially obscured by noise but, in any event, the CSEM data interpreter will rely on the distinction between the two curves to infer the presence or absence of a hydrocarbon reservoir. FIG. 5 represents an ideal or desired situation where the data are uncontaminated by air waves.

By contrast, FIG. 6 compares synthetic data with a reservoir present (solid line 62) and absent (dashed line 64). Here, the seawater is only 200 m thick beneath an infinite half-space of air. The synthetic data are markedly different from FIG. 5, being dominated by air-wave noise at offsets beyond about 5 km. The strong air wave is not surprising, since the water thickness is only about one-half of a skin depth at the 0.5 Hz frequency used for these computer simulations. The small difference between the curves in FIG. 6 with and without a reservoir present implies that the CSEM data interpreter may have a great deal of difficulty identifying the presence of a reservoir, particularly in the presence of other noises and normal resistivity variations that are not associated with hydrocarbons. FIG. 6 thus represents a common, but undesirable situation in which hydrocarbon signatures in CSEM data are obscured by air-wave noise. Clearly, it is desirable to have effective methods of removing air waves from CSEM data.

The problem of removing air-wave noise from marine CSEM data has only recently attracted attention as interest has heightened in using these surveys for oil and gas exploration. Two solutions are known in the published literature. In PCT application WO 03/100467A1, Amundsen discloses mathematical methods for resolving the electromagnetic wavefield recorded at the receivers into upgoing and downgoing components and then analyzing the upgoing component to derive the nature of the strata beneath the seafloor. Amundsen acknowledges that downward-traveling energy includes both energy propagating from the source to the receiver by way of the air-water boundary as well as energy propagating from the source to the subsea strata before propagating to the air-water boundary and to the receiver. As described above, such multiply-reflected signals are significantly imprinted by the electrical properties of air and most properly counted as air-wave noise. In PCT application WO 05/010560A1, Lu et al. disclose a method of subtracting from the air-wave contaminated data the difference between two synthetic data sets representing (1) the earth response beneath an infinite half-space of water and (2) the earth response beneath an infinite half-space of air and a water layer of finite thickness.

Both of these approaches must make various assumptions and approximations that can render them ineffective and costly. Amundsen must assume that upgoing energy is free of air-wave noise. In fact, upgoing energy includes some air-wave noise, as can be seen in FIG. 7 showing upgoing electromagnetic energy amidst layers of air 71, water 72, and earth 73. The upgoing (at the receiver) energy following path 74 from source location 10 to receiver 11 is preserved for analysis by Amundsen's method. However, energy following path 77 from source location 78 is also preserved for analysis even though it includes air-wave noise. Amundsen's formulae for removing downgoing energy require measurements of both the electric and magnetic fields at each receiver location. It is not always possible or economically practical to measure both the electric and magnetic field components with equal accuracy.

Lu et al. require that a resistivity model of the sub-sea sediments be developed. This model is then varied to generate the synthetic air-wave noise that is to be subtracted from the measured data. But the model is itself uncertain and must be determined from the data and any a priori information. Errors in this model will generate an erroneous estimate of the air-wave noise, leading to errors in the data following air-wave suppression.

Accordingly, an improved method is needed for correcting CSEM data for air wave effects. The present invention satisfies this need.

SUMMARY OF THE INVENTION

In one embodiment, the invention is a method for correcting electromagnetic field data from a controlled source electromagnetic survey of a subterranean underwater region to reduce air wave noise in signals measured at survey receivers located in the water layer at or near the water bottom, said method comprising:

(a) obtaining at least one conductivity (or resistivity) value for the water;

(b) simulating synthetic electromagnetic field data for at least one selected survey receiver location assuming an all-water earth model based on the survey region except with air and below-water layers replaced by more water, using survey source locations associated with the selected receiver locations and source signal generating parameters and the at least one water conductivity (or resistivity) value;

(c) simulating synthetic electromagnetic field data for the selected survey receiver locations assuming an air-water earth model based on the survey region except with more water replacing below-water-bottom sediment, using survey source locations associated with the selected receiver locations and source signal generating parameters and the at least one water conductivity (or resistivity) value; and (d) calculating electromagnetic field values corresponding to a hypothetical water-sediment earth model based on the survey region except with more water replacing an air half space, said calculation using measured survey electromagnetic data and synthetic data from the all-water model and the air-water model, wherein said calculated electromagnetic field values represent measured data adjusted to remove air wave noise.

After adjusting the electromagnetic field data to reduce air-wave noise, the adjusted data can be used to produce resistivity maps that are then examined for presence of anomalies that may indicate hydrocarbon deposits.

BRIEF DESCRIPTION OF THE DRAWINGS

The present invention and its advantages will be better understood by referring to the following detailed description and the attached drawings in which.

The same reference numbers may be used in different drawings to refer to similar features.

The invention will be described in connection with its preferred embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the spirit and scope of the invention, as defined by the appended claims.

DETAILED DESCRIPTION OF THE PREFERRED EMBODIMENTS

This invention is a method for suppressing air-wave noise in marine electromagnetic data based on the data itself and properties of the air and seawater but without knowledge of the sub-sea sediments. The method is a calculation performed numerically on CSEM data and resulting in an estimate of those data that would have been acquired had the water layer extended infinitely upward from the seafloor.

Figure 1:
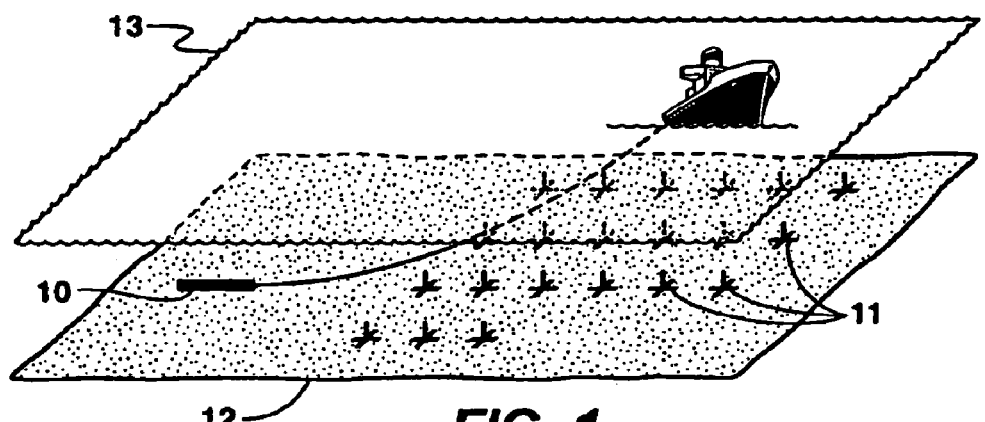
FIG. 1 illustrates deployment of equipment in a typical marine CSEM survey.
Figure 2A:
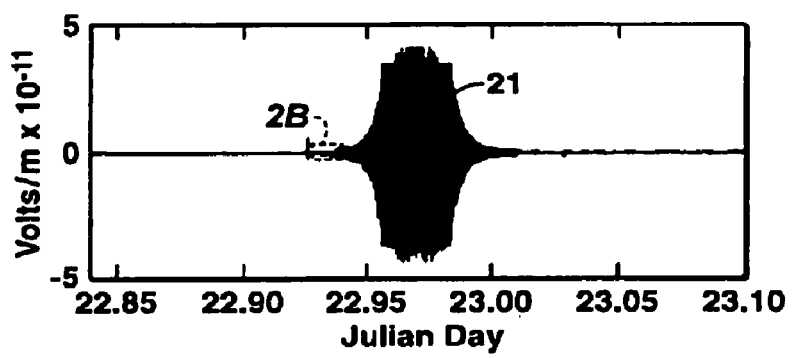
FIGS. 2A and 2B depict a received CSEM signal and the transmitter waveform that gave rise to it as functions of time.
Figure 2B:
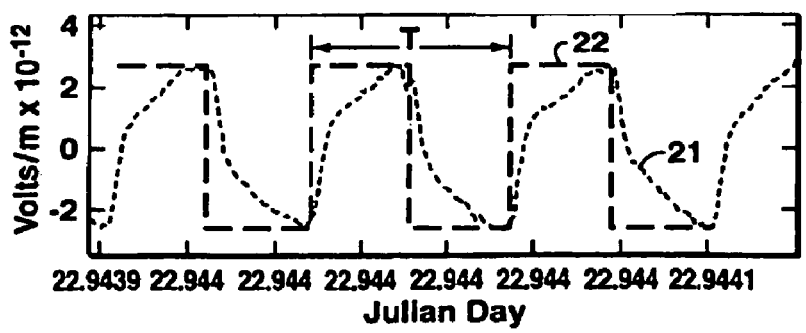
Figure 3A:
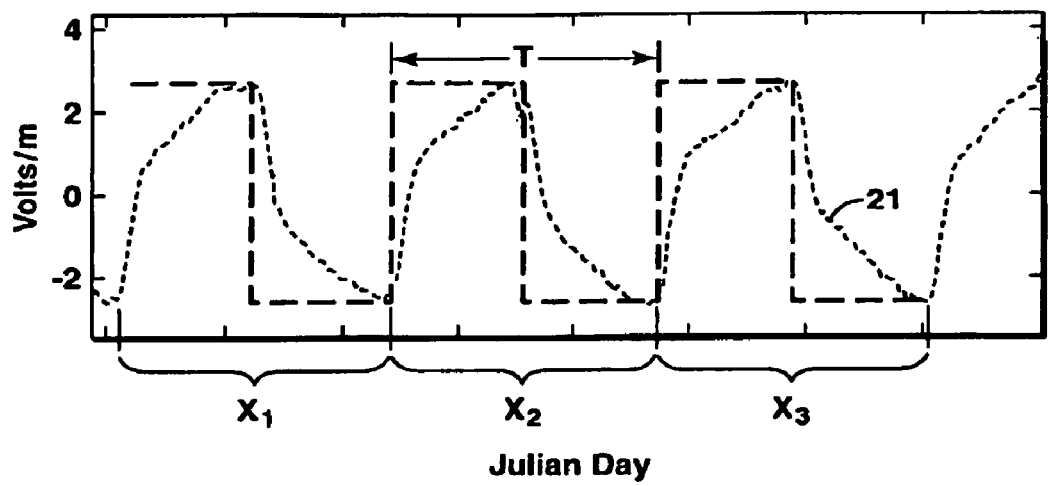
FIGS. 3A and 3B illustrate the process of binning a receiver signal in time and determining the frequency spectrum within each time bin by Fourier analysis.
Figure 3B:
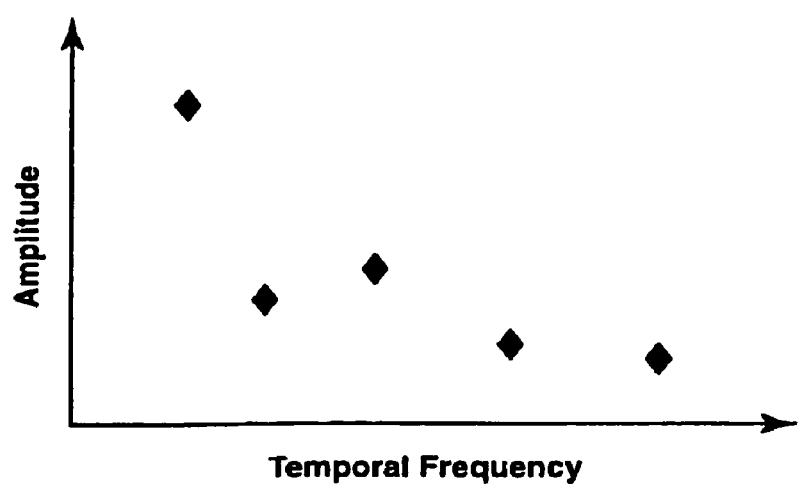
Figure 4:
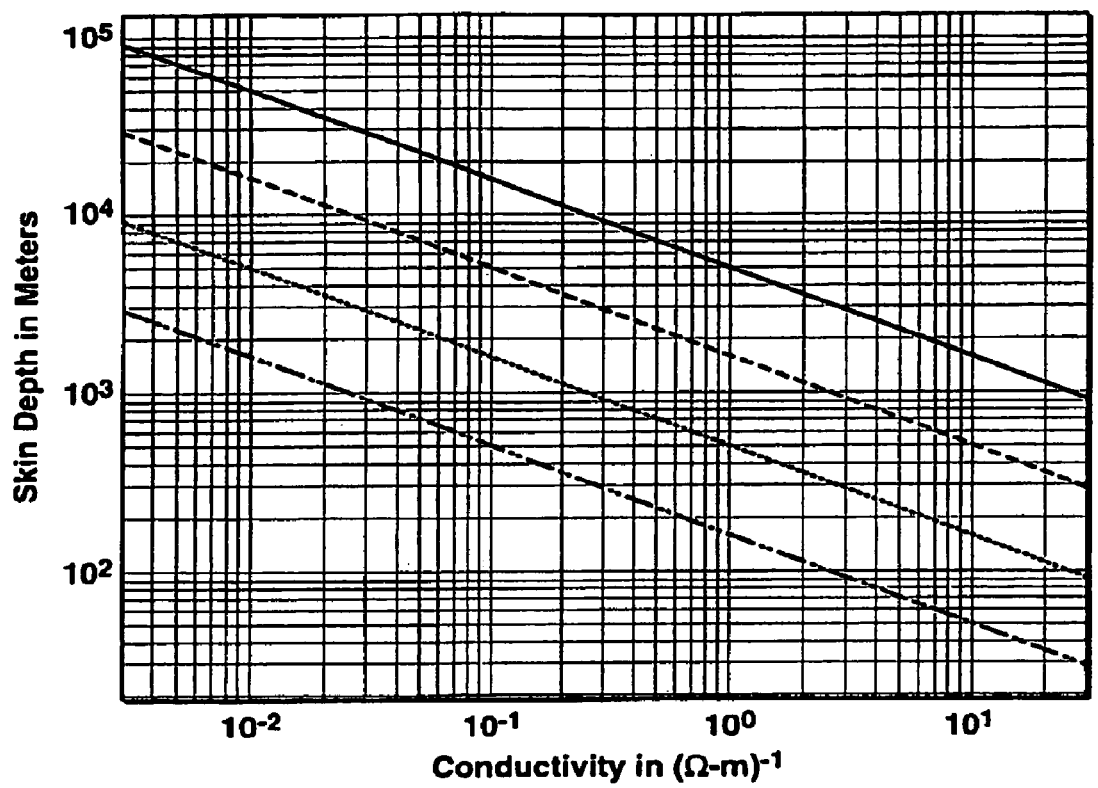
FIG. 4 is a graph of skin depth vs. electrical conductivity at four different frequencies.
Figure 5:
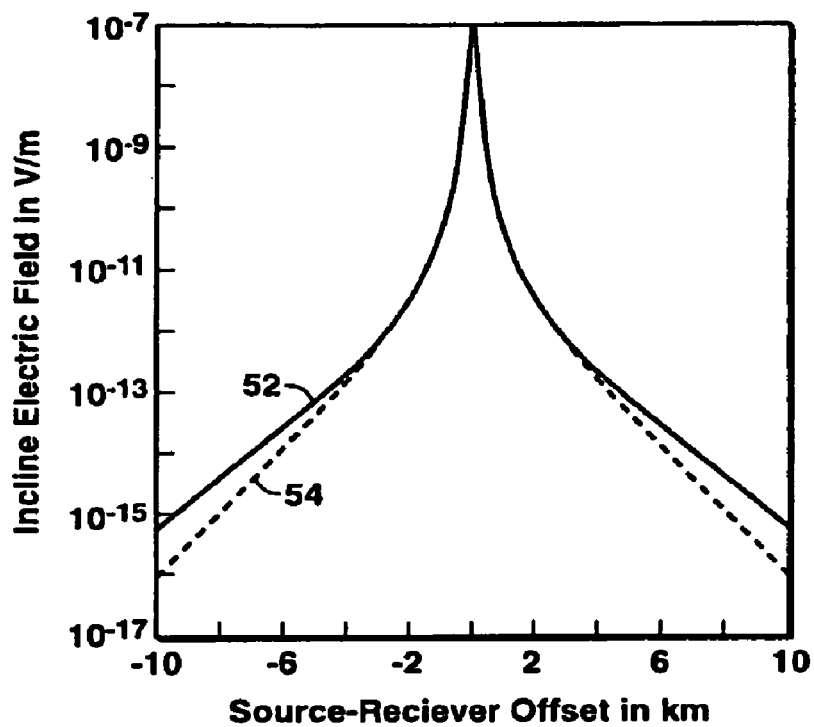
FIG. 5 is a graph comparing synthetic CSEM data with a hydrocarbon reservoir in the model to data for the same model with no reservoir, assuming an infinite sea water depth (no air layer in the model)
Figure 6:
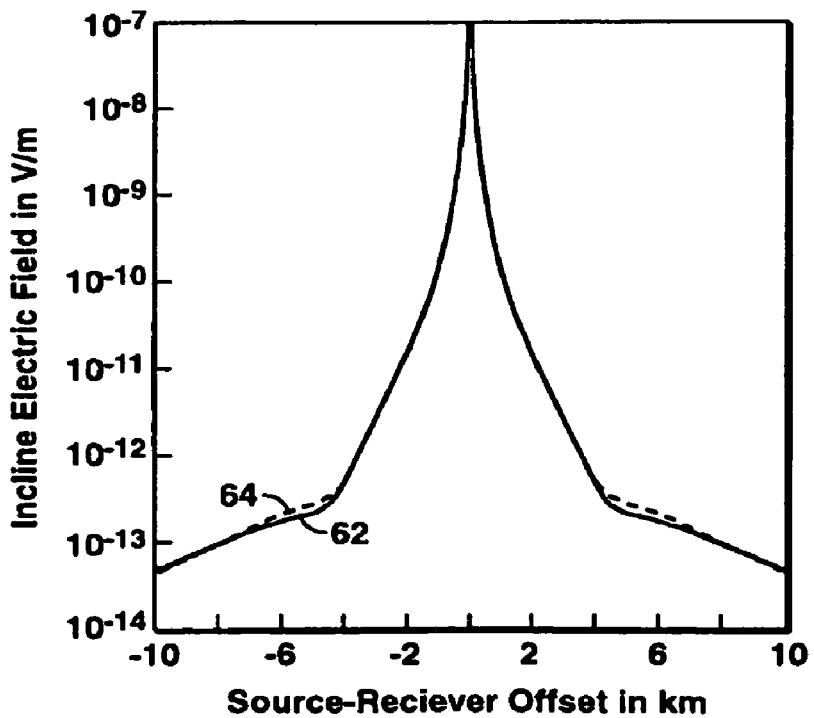
FIG. 6 shows the same model calculations as in FIG. 5, except the sea water is only 200 m deep, with air above it.
Figure 7:
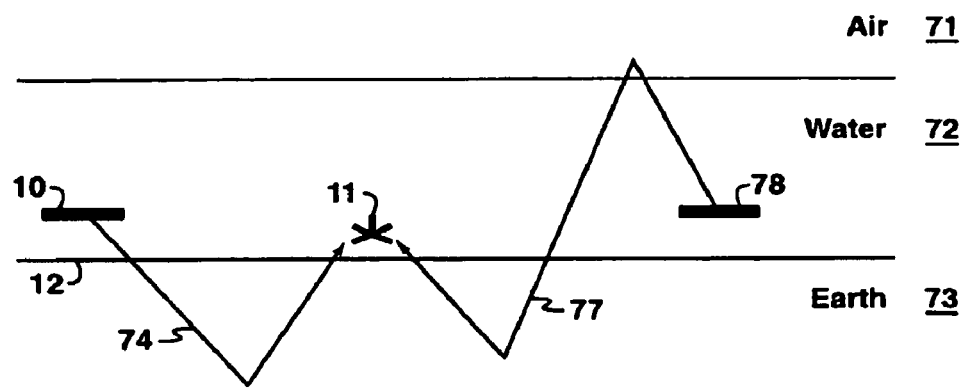
FIG. 7 illustrates two possible paths each resulting in upcoming electromagnetic energy at a receiver.
Figure 8:
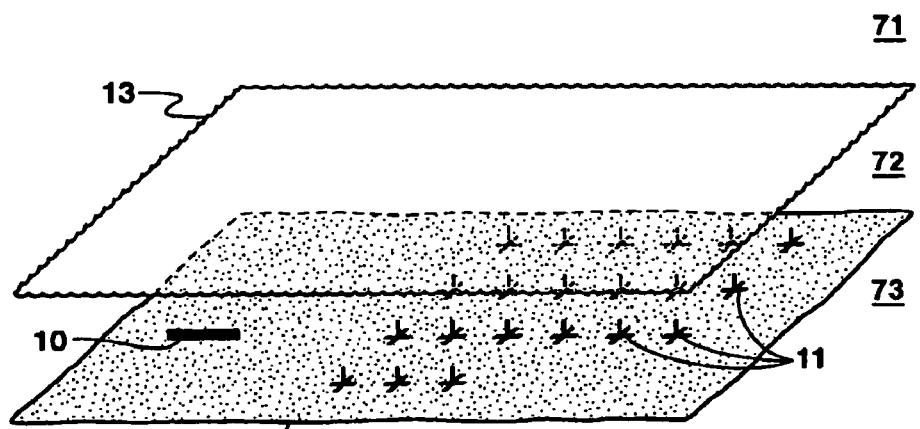
FIG. 8 illustrates a three-layer (air, water, and sediment) earth model with CSEM equipment for a hypothetical survey.

The present inventive method may be best understood by comparing four different models for the conductivity structure of the earth (FIGS. 8, 9, 10, and 11). FIG. 8 depicts a typical CSEM survey with the earth conductivity described by air 71, water 72, and sediments 73. Data are acquired in receivers 11 as a result of energizing the earth with source 10. This situation describes actual acquisition in the field and, depending on water depth, offset, and frequency, the data may contain significant amounts of air-wave noise.

Figure 9:
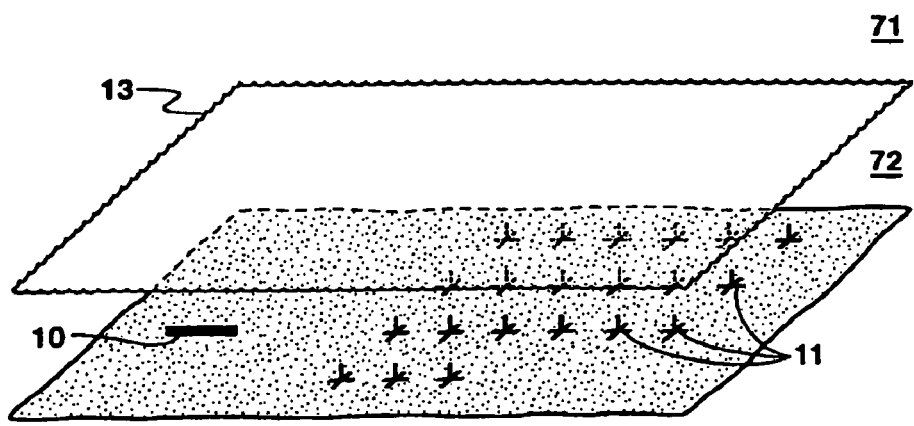
FIG. 9 illustrates a two-layer earth model (no sea bottom sediment layer)

FIG. 9 depicts a second, hypothetical survey in which the seafloor sediments 73 are absent, so that the seawater 72 extends infinitely downward below the air-water interface 13. That is, the seafloor 12 is absent in FIG. 9. It is understood that the source 10 and receivers 11 are in the same positions relative to the air-water interface as in FIG. 8.

Figure 10:
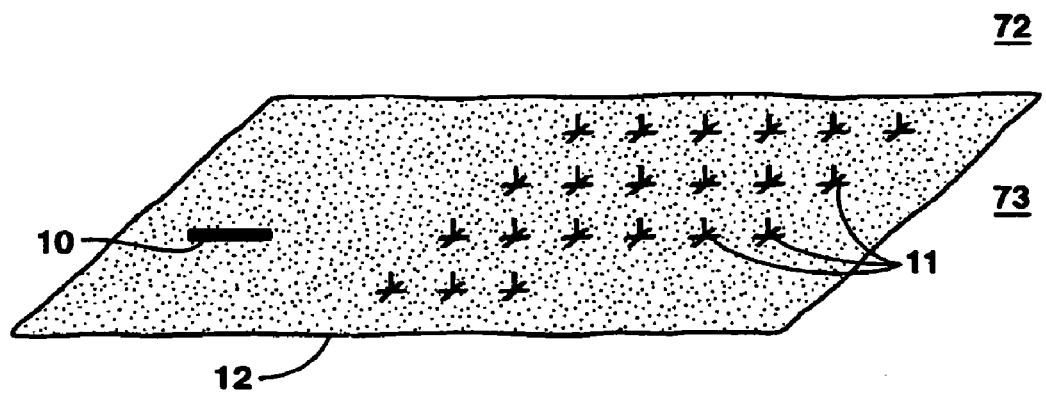
FIG. 10 illustrates a two-layer earth model (no air layer)

FIG. 10 depicts a third, idealized survey in which the air layer is absent so that the seawater 72 extends infinitely upward. Data in this model contain information about the sub-sea sediments 73 but are uncontaminated by air-wave noise because of the absence of the air layer. With no air layer, waves starting upward from the source are never reflected from an air layer and therefore never contaminated by air-wave noise. Likewise, waves starting downward from the source and subsequently reflected upward by subsea strata are never reflected back down by an air layer and never contaminated by air-wave noise. Waves traveling directly through the water layer to the receivers are strongly attenuated by the short skin depth in water. These data are therefore desirable and are, in fact, the outcome of practicing the present invention.

Figure 11:
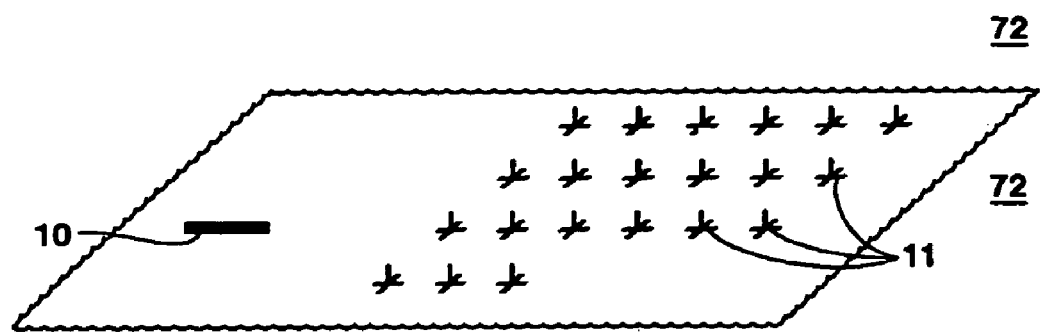
FIG. 11 illustrates a one-layer earth model (all water)

The fourth hypothetical survey is depicted in FIG. 11. In this situation, both the air 71 and sediments 73 are absent as is the seafloor 12, so that the survey is conducted entirely in water 72.

The present invention draws upon realizing that:

data that would have been acquired in the hypothetical surveys of FIGS. 9 and 11 can be simulated from knowledge of the physical properties of air and seawater, the equations that describe the propagation of electromagnetic waves and the locations of sources and receivers;

CSEM data are actually measured under the conditions of FIG. 8; and, data that would have been acquired under the conditions of FIG. 10 can be computed from these synthetic and actual data.

The electric field, $\vec{E}$, in the air-water-sediment model of FIG. 8 is described by the vector equation (see Newman, et al., "Frequency-domain modeling of airborne electromagnetic responses using staggered finite differences", Geophysical Prospecting, 43, 1021-1042 (1995))

$$\nabla \times \nabla \times \vec{E}(\vec{x},\omega) + \kappa^2 \vec{E}(\vec{x},\omega) = -i\omega\mu \vec{J}(\vec{x},\omega). \tag{1}$$

Here, $\vec{x}$ is the location of the field value, $\vec{J}$ is the current density at the transmitter, $\omega$ is the angular frequency, $\mu$ is the magnetic permeability, and $\kappa^2 = i\omega\mu\sigma(\vec{x})$ describes the entire conductivity structure of earth and water. In air, where the conductivity is very small, the more general expression $\kappa^2 = i\omega\mu\sigma + \omega^2\mu\in$ is appropriate, where $\in$ is the dielectric permittivity. Since the current density in equation (1) might generally be distributed, over some volume (a typical source antenna might be 100-500 m long), it is convenient to define a tensor Green function, $\overleftrightarrow{G}$, as the solution to equation (1) for a point source $$\nabla \times \nabla \times \overleftrightarrow{G}(\vec{x}-\vec{x_0},\omega) + \kappa^2 \overleftrightarrow{G}(\vec{x}-\vec{x_0},\omega) = -4\pi \overleftrightarrow{I} \delta^3(\vec{x}-\vec{x_0}) \tag{2}$$

where $\delta^3$ is the Dirac delta function in three dimensions. The electric field is given by $$\vec{E}(\vec{x},\omega) = \frac{i\omega\mu}{4\pi}\int d^3x_0 \overleftrightarrow{G}(\vec{x}-\vec{x_0},\omega)\bullet\vec{J}(\vec{x_0},\omega). \tag{3}$$

Both the Green function and identity matrix, $\overleftrightarrow{I}$, are 3-by-3 matrices corresponding to the three vector components of $\vec{E}$ and $\vec{J}$. Examining equation (3), it will be seen that the Green function and electric field data are substantially equivalent. That is, the elements of the Green function are electric field values corresponding to different orientations of the transmitter, normalized by the current density and frequency. That is, by varying $\vec{J}$ in equation (1) the elements of $\overleftrightarrow{G}$ can determined from the elements of $\vec{E}$ by accounting for the different constants on the right-hand sides of equations (1) and (2). The seawater may be represented by layers of differing conductivities. For example, the water nearest to the air could be more saline due to evaporation and, therefore, more conductive. The vector dot product is indicated by "●".

In the air-water model of FIG. 9, the electric field $\vec{E}_0$ and Green function $\overleftrightarrow{G}$ are solutions of $$\vec{E}_0(\vec{x},\omega) = \frac{i\omega\mu}{4\pi}\int d^3x_0 \overleftrightarrow{G}_0(\vec{x}-\vec{x_0},\omega)\cdot\vec{J}(\vec{x_0},\omega) \tag{4}$$

$$\nabla \times \nabla \times \overleftrightarrow{G}_0(\vec{x}-\vec{x_0},\omega) + \kappa_0^2 \overleftrightarrow{G}_0(\vec{x}-\vec{x_0},\omega) = -4\pi \overleftrightarrow{I}\delta^3(\vec{x}-\vec{x_0}) \tag{5}$$

where the subscript "0" on $\vec{E}_0$ and $\overleftrightarrow{G}$ indicates the absence of the sediments. Thus, $\kappa^2$ and $\kappa_0^2$ differ below the seafloor but are equal above the seafloor. The electric field and Green function are related by an equation analogous to equation (3). An enabling element of the present invention is the fact that $\vec{E}_0$ and $\overleftrightarrow{G}$ may be computed by known methods (see, for example, Wannamaker et al., "Electromagnetic modeling of three-dimensional bodies in layered earths using integral equations", Geophysics 49, 60-74 (1984); and Ward et al., op. cit., pp. 203 ff) without knowledge of the sub-sea sediment conductivities. To compute $\vec{E}_0$ or its equivalent $\overleftrightarrow{G}$ requires knowledge of the seawater and air conductivities ($\kappa_0^2$) in addition to positions and currents that are specified as part of the CSEM survey. In any particular survey, the air and seawater conductivities may be measured directly, estimated from the CSEM data, or estimated from measurements at neighboring locations.

Similarly, the field $\vec{E}'$ and Green function $\overleftrightarrow{G}$ for the water-sediment model of FIG. 10 are solutions of $$\vec{E}'(\vec{x},\omega) = \frac{i\omega\mu}{4\pi}\int d^3x_0 \overleftrightarrow{G}'(\vec{x}-\vec{x_0},\omega)\cdot\vec{J}(\vec{x_0},\omega) \tag{6}$$

and $$\nabla \times \nabla \times \overleftrightarrow{G}'(\vec{x}-\vec{x_0},\omega) + \kappa'^2 \overleftrightarrow{G}'(\vec{x}-\vec{x_0},\omega) = -4\pi \overleftrightarrow{I}\delta^3(\vec{x}-\vec{x_0}) \tag{7}$$

where $\kappa'^2$ depends on the conductivity of the seawater and sub-sea sediments. Thus, $\kappa^2$ and $\kappa'^2$ differ above the air-water interface but are equal below it. Since it contains no air-wave noise, the field $\vec{E}'$ is desirable for exploration of the sub-sea sediments and is approximately computed by the method of this invention.

Finally, like the survey in FIG. 9, the electric field and Green function values for the water-only survey of FIG. 11 may be computed without knowledge of the sub-sea sediment conductivities (Ward et al., op. cit., p. 181). Denoting the field and Green function by a superscript "d" (for "direct" or "direct arrival"), one obtains $$\vec{E}^d(\vec{x}, \omega) = \frac{i\omega\mu}{4\pi} \int d^3 x_0 \overleftrightarrow{G^d}(\vec{x} - \vec{x_0}, \omega) \cdot \vec{J}(\vec{x_0}, \omega) \quad (8)$$

$$\nabla \times \nabla \times \overleftrightarrow{G^d}(\vec{x} - \vec{x_0}, \omega) + \kappa_w^2 \overleftrightarrow{G^d}(\vec{x} - \vec{x_0}, \omega) = -4\pi \overleftrightarrow{I} \delta^3(\vec{x} - \vec{x_0}) \quad (9)$$

where $\kappa_w^2 = i\omega\mu\sigma_w$, $\sigma_w$ the conductivity of water.

The invention is based on the existence of formulae relating the measured data containing air-wave noise ($\vec{E}$ or, equivalently, $\overleftrightarrow{}$) to the desired, noise-free data ($\vec{E}'$ or $\overleftrightarrow{}$) and the calculable functions $\overleftrightarrow{}$ and $\overleftrightarrow{}$. The invention consists of evaluating these formulae to generate one or more approximations to the desired $\vec{E}'$ from the measured $\vec{E}$.

To derive the needed relationships, one subtracts equation (5) from equation (2) giving $$\nabla \times \nabla \times [\overleftrightarrow{}(\vec{x}-\vec{x_0},\omega) - \overleftrightarrow{}(\vec{x}-\vec{x_0},\omega)] + \kappa_0^2 [\overleftrightarrow{}(\vec{x}-\vec{x_0},\omega) - \overleftrightarrow{}(\vec{x}-\vec{s_0},\omega)] = -(\kappa^2 - \kappa_0^2) \overleftrightarrow{}(\vec{x}-\vec{x_0},\omega)$$

which, based on the defining equation (5) for $\overleftrightarrow{}$, has a solution $$\overleftrightarrow{G}(\vec{x} - \vec{x_0}, \omega) - \overleftrightarrow{G_0}(\vec{x} - \vec{x_0}, \omega) = \frac{1}{4\pi} \int d^3 x_1 \overleftrightarrow{G_0}(\vec{x} - \vec{x_1}, \omega)[\kappa^2 - \kappa_0^2] \cdot \overleftrightarrow{G}(\vec{x_1} - \vec{x_0}, \omega)$$

Similarly, subtracting equation (9) from equation (7) gives $$\nabla \times \nabla \times [\overleftrightarrow{}(\vec{x}-\vec{x_0},\omega) - \overleftrightarrow{}(\vec{x}-\vec{x_0},\omega)] + \kappa_w^2 [\overleftrightarrow{}(\vec{x}-\vec{x_0},\omega) - \overleftrightarrow{}(\vec{x}-\vec{x_0},\omega)] = -(\kappa'^2 - \kappa_w^2) \overleftrightarrow{}(\vec{x}-\vec{x_0},\omega)$$

which has the solution $$\overleftrightarrow{G'}(\vec{x} - \vec{x_0}, \omega) - \overleftrightarrow{G^d}(\vec{x} - \vec{x_0}, \omega) = \frac{1}{4\pi} \int d^3 x_1 \overleftrightarrow{G^d}(\vec{x} - \vec{x_1}, \omega)[\kappa'^2 - \kappa_w^2] \cdot \overleftrightarrow{G'}(\vec{x_1} - \vec{x_0}, \omega).$$

The conductivities in $\kappa^2$ and $\kappa_0^2$ differ only in the region below the seafloor, where $\kappa^2$ consists of sediment resistivities and $\kappa_0^2$ consists of water. Likewise, the conductivities $\kappa'^2$ and $\kappa_w^2$ differ only below the seafloor, where $\kappa'^2$ consists of sediment resistivities and $\kappa_0^2$ consists of water. It is therefore possible to abbreviate $$\kappa^2(\vec{x}) - \kappa_0^2(\vec{x}) = \kappa'^2(\vec{x}) - \kappa_w^2(\vec{x}) = V(\vec{x}) \quad (65)$$

so that $$\overleftrightarrow{G}(\vec{x} - \vec{x_0}, \omega) = \quad (10)$$
$$\overleftrightarrow{G_0}(\vec{x} - \vec{x_0}, \omega) + \frac{1}{4\pi} \int d^3 x_1 \overleftrightarrow{G_0}(\vec{x} - \vec{x_1}, \omega) V(\vec{x_1}) \cdot \overleftrightarrow{G}(\vec{x_1} - \vec{x_0}, \omega)$$

and $$\overleftrightarrow{G'}(\vec{x} - \vec{x_0}, \omega) = \quad (11)$$
$$\overleftrightarrow{G^d}(\vec{x} - \vec{x_0}, \omega) + \frac{1}{4\pi} \int d^3 x_1 \overleftrightarrow{G^d}(\vec{x} - \vec{x_1}, \omega) V(\vec{x_1}) \cdot \overleftrightarrow{G'}(\vec{x_1} - \vec{x_0}, \omega)$$

Before proceeding, equations (10) and (11) are restricted from arbitrary source and receiver locations to the regions $\Omega_0$ where the source is actually excited and $\Omega$ where the data are recorded:

$$\overleftrightarrow{G}(\vec{\Omega} - \vec{\Omega_0}, \omega) = \quad (12)$$
$$\overleftrightarrow{G_0}(\vec{\Omega} - \vec{\Omega_0}, \omega) + \frac{1}{4\pi} \int d^3 x_1 \overleftrightarrow{G_0}(\vec{\Omega} - \vec{x_1}, \omega) V(\vec{x_1}) \cdot \overleftrightarrow{G}(\vec{x_1} - \vec{\Omega_0}, \omega)$$

and $$\overleftrightarrow{G'}(\vec{\Omega} - \vec{\Omega_0}, \omega) = \quad (13)$$
$$\overleftrightarrow{G^d}(\vec{\Omega} - \vec{\Omega_0}, \omega) + \frac{1}{4\pi} \int d^3 x_1 \overleftrightarrow{G^d}(\vec{\Omega} - \vec{x_1}, \omega) V(\vec{x_1}) \cdot \overleftrightarrow{G'}(\vec{x_1} - \vec{\Omega_0}, \omega)$$

In general, $\Omega_0$ and $\Omega$ could span isolated points or linear, planar, or volumetric regions. In practice, they will most frequently correspond to lines towed by sources or occupied by receivers. The desired relation between measured and desired data comes from eliminating $V(\vec{x}_1)$ between equations (12) and (13). It is this step that eliminates the need to know sub-sea conductivities in the present invention. Introducing the inverse Green functions defined by $$\int d\Omega_1 \overleftrightarrow{}(\vec{x_1}-\vec{\Omega_1},\omega) \cdot \overleftrightarrow{}(\vec{\Omega_1}-\vec{x_3},\omega) = \overleftrightarrow{I} \delta^3(\vec{x}_1 - \vec{x}_3) \quad (14)$$

and $$\int d\Omega_{21} \overleftrightarrow{}(\vec{x_3}-\vec{\Omega_2},\omega) \cdot \overleftrightarrow{}(\vec{\Omega_2}-\vec{x_5},\omega) = \overleftrightarrow{I} \delta^3(\vec{x}_3 - \vec{x}_5) \quad (15)$$

results in $$\overleftrightarrow{G'}(\vec{\Omega} - \vec{\Omega_0}, \omega) = \overleftrightarrow{G^d}(\vec{\Omega} - \vec{\Omega_0}, \omega) + \frac{1}{4\pi} \int d^3 x_1 \overleftrightarrow{G^d}(\vec{\Omega} - \vec{x_1}, \omega) V(\vec{x_1}) \cdot$$
$$\overleftrightarrow{G'}(\vec{x_1} - \vec{\Omega_0}, \omega)$$
$$= \overleftrightarrow{G^d}(\vec{\Omega} - \vec{\Omega_0}, \omega) + \frac{1}{4\pi} \int d^3 x_1 d\Omega_1 d^3 x_3 d\Omega_2 d^3 x_5$$
$$\overleftrightarrow{G^d}(\vec{\Omega} - \vec{x_1}, \omega) \cdot \overleftrightarrow{G_0^{-1}}(\vec{x_1} - \vec{\Omega_1}, \omega) \cdot$$
$$\overleftrightarrow{G_0}(\vec{\Omega_1} - \vec{x_3}, \omega) V(\vec{x_3}) \cdot \overleftrightarrow{G}(\vec{x_3} - \vec{\Omega_2}, \omega) \cdot$$
$$\overleftrightarrow{G^{-1}}(\vec{\Omega_2} - \vec{x_5}, \omega) \cdot \overleftrightarrow{G'}(\vec{x_5} - \vec{\Omega_0}, \omega)$$
$$= \overleftrightarrow{G^d}(\vec{\Omega} - \vec{\Omega_0}, \omega) + \int d^3 x_1 d\Omega_1 d\Omega_2 d^3 x_5$$
$$\overleftrightarrow{G^d}(\vec{\Omega} - \vec{x_1}, \omega) \cdot \overleftrightarrow{G_0^{-1}}(\vec{x_1} - \vec{\Omega_1}, \omega) \cdot$$
$$(\overleftrightarrow{G}(\vec{\Omega_1} - \vec{\Omega_2}, \omega) - \overleftrightarrow{G_0}(\vec{\Omega_1} - \vec{\Omega_2}, \omega)) \cdot$$

-continued
$$\overleftrightarrow{G'^{-1}}(\vec{\Omega}_2 - \vec{x}_5, \omega) \cdot \overleftrightarrow{G'}(\vec{x}_5 - \vec{\Omega}_0, \omega)$$

To simplify this expression, the inventor introduces the Fourier transform representations $$\overleftrightarrow{G'}(\vec{\Omega} - \vec{\Omega}_0, \omega) = \frac{1}{(2\pi)^3} \int d^3k \overleftrightarrow{g'}(\vec{k}, \omega) e^{i\vec{k}\cdot(\vec{\Omega}-\vec{\Omega}_0)}, \quad (16a)$$

$$\overleftrightarrow{G^d}(\vec{\Omega} - \vec{\Omega}_0, \omega) = \frac{1}{(2\pi)^3} \int d^3k \overleftrightarrow{g^d}(\vec{k}, \omega) e^{i\vec{k}\cdot(\vec{\Omega}-\vec{\Omega}_0)}, \quad (16b)$$

$$\overleftrightarrow{\tilde{G}}(\vec{\Omega} - \vec{\Omega}_0, \omega) = \frac{1}{(2\pi)^3} \int d^3k \overleftrightarrow{\tilde{g}}(\vec{k}, \omega) e^{i\vec{k}\cdot(\vec{\Omega}-\vec{\Omega}_0)}, \quad (16c)$$

$$\overleftrightarrow{G'^{-1}}(\vec{\Omega} - \vec{\Omega}_0, \omega) = \frac{1}{(2\pi)^3} \int d^3k \overleftrightarrow{g'^{-1}}(\vec{k}, \omega) e^{i\vec{k}\cdot(\vec{\Omega}-\vec{\Omega}_0)}, \quad (16d)$$

$$\overleftrightarrow{G_0}(\vec{\Omega} - \vec{\Omega}_0, \omega) = \frac{1}{(2\pi)^3} \int d^3k \overleftrightarrow{g_0}(\vec{k}, \omega) e^{i\vec{k}\cdot(\vec{\Omega}-\vec{\Omega}_0)}, \quad (16e)$$

$$\overleftrightarrow{G_0^{-1}}(\vec{\Omega} - \vec{\Omega}_0, \omega) = \frac{1}{(2\pi)^3} \int d^3k \overleftrightarrow{g_0^{-1}}(\vec{k}, \omega) e^{i\vec{k}\cdot(\vec{\Omega}-\vec{\Omega}_0)}, \quad (16f)$$

and the inverse transform $$\overleftrightarrow{\leftrightarrow}(\vec{k}, \omega) = \int d^3(\vec{\Omega}-\vec{\Omega}_0) \overleftrightarrow{\leftrightarrow}(\vec{\Omega}-\vec{\Omega}_0, \omega) e^{-i\vec{k}\cdot(\vec{\Omega}-\vec{\Omega}^0)}. \quad (16g)$$

In the Fourier transform domain, the $x_1$ and $x_5$ integrals are carried out to obtain $$\overleftrightarrow{g'}(\vec{k}, \omega) = \overleftrightarrow{g^d}(\vec{k}, \omega) + \frac{1}{(2\pi)^{15}} \int d^3x_1 d\Omega_1 d\Omega_2 d^3x_5 d^3k_1 d^3k_2$$
$$d^3k_3 d^3k_4 d^3k_5 d^3(\Omega-\Omega_0) \overleftrightarrow{g^d}(\vec{k}_1, \omega) \cdot \overleftrightarrow{g_0^{-1}}(\vec{k}_2, \omega) \cdot$$
$$(\overleftrightarrow{\tilde{g}}(\vec{k}_3, \omega) - \overleftrightarrow{g_0}(\vec{k}_3, \omega)) \cdot \overleftrightarrow{g^{-1}}(\vec{k}_4, \omega) \cdot \overleftrightarrow{g'}(\vec{k}_5, \omega)$$
$$e^{i\vec{k}_1\cdot(\vec{\Omega}-\vec{x}_1)} e^{i\vec{k}_2\cdot(\vec{x}_1-\vec{\Omega}_1)} e^{i\vec{k}_3\cdot(\vec{\Omega}_1-\vec{\Omega}_2)} e^{i\vec{k}_4\cdot(\vec{\Omega}_3-\vec{z}_3)}$$
$$e^{i\vec{k}_5\cdot(\vec{x}_5-\vec{\Omega}_0)} e^{-i\vec{k}\cdot(\vec{\Omega}-\vec{\Omega}_0)}$$
$$= \overleftrightarrow{g^d}(\vec{k}, \omega) + \frac{1}{(2\pi)^9} \int d\Omega_1 d\Omega_2 d^3k_1 d^3k_2 d^3k_3 d^3k_4$$
$$d^3k_5 d^3(\Omega-\Omega_0) \overleftrightarrow{g^d}(\vec{k}_1, \omega) \cdot \overleftrightarrow{g_0^{-1}}(\vec{k}_2, \omega) \cdot$$
$$(\overleftrightarrow{\tilde{g}}(\vec{k}_3, \omega) - \overleftrightarrow{g^0}(\vec{k}_3, \omega)) \cdot \overleftrightarrow{g^{-1}}(\vec{k}_4, \omega) \cdot \overleftrightarrow{g'}(\vec{k}_5, \omega)$$
$$e^{i\vec{k}_1\cdot\vec{\Omega}} e^{-i\vec{k}_2\cdot\vec{\Omega}_1} e^{i\vec{k}_3\cdot(\vec{\Omega}_1-\vec{\Omega}_2)} e^{i\vec{k}_4\cdot\vec{\Omega}_2} e^{-i\vec{k}_5\cdot\vec{\Omega}_0} e^{-i\vec{k}\cdot(\vec{\Omega}-\vec{\Omega}_0)}$$
$$\delta^3(\vec{k}_1 - \vec{k}_2) \delta^3(\vec{k}_4 - \vec{k}_5)$$

The $k_2$, $k_5$, $\Omega_1$, and $\Omega_2$ integrals are then carried out to obtain $$\overleftrightarrow{g'}(\vec{k}, \omega) = \overleftrightarrow{g^d}(\vec{k}, \omega) + \frac{1}{(2\pi)^9} \int d\Omega_1 d\Omega_2 d^3k_1 d^3k_3$$
$$d^3k_4 d^3(\Omega-\Omega_0) \overleftrightarrow{g^d}(\vec{k}_1, \omega) \cdot \overleftrightarrow{g_0^{-1}}(\vec{k}_1, \omega) \cdot$$
$$(\overleftrightarrow{\tilde{g}}(\vec{k}_3, \omega) - \overleftrightarrow{g_0}(\vec{k}_3, \omega)) \cdot \overleftrightarrow{g^{-1}}(\vec{k}_4, \omega) \cdot \overleftrightarrow{g'}(\vec{k}_4, \omega)$$
$$e^{i\vec{k}_1\cdot\vec{\Omega}} e^{-i\vec{k}_1\cdot\vec{\Omega}_1} e^{i\vec{k}_3\cdot(\vec{\Omega}_1-\vec{\Omega}_2)} e^{i\vec{k}_4\cdot\vec{\Omega}_2}$$

-continued
$$e^{-i\vec{k}_4\cdot\vec{\Omega}_0} e^{-i\vec{k}\cdot(\vec{\Omega}-\vec{\Omega}_0)}$$
$$= \overleftrightarrow{g^d}(\vec{k}, \omega) + \frac{1}{(2\pi)^3} \int d^3k_1 d^3k_3 d^3k_4 d^3(\Omega-\Omega_0)$$
$$\overleftrightarrow{g^d}(\vec{k}_1, \omega) \cdot \overleftrightarrow{g_0^{-1}}(\vec{k}_1, \omega) \cdot (\overleftrightarrow{\tilde{g}}(\vec{k}_3, \omega) - \overleftrightarrow{g_0}(\vec{k}_3, \omega)) \cdot$$
$$\overleftrightarrow{g^{-1}}(\vec{k}_4, \omega) \cdot \overleftrightarrow{g'}(\vec{k}_4, \omega) e^{i\vec{k}_1\cdot\vec{\Omega}} e^{-i\vec{k}_4\cdot\vec{\Omega}_0} \delta^3(\vec{k}_1 - \vec{k}_3)$$
$$e^{-i\vec{k}\cdot(\vec{\Omega}-\vec{\Omega}_0)} \delta^3(\vec{k}_3 - \vec{k}_4)$$

Finally, the $k_3$, $k_4$, $\Omega-\Omega_0$, and $k_1$ integrals are carried out to obtain $$\overleftrightarrow{g'}(\vec{k}, \omega) = \overleftrightarrow{g^d}(\vec{k}, \omega) + \frac{1}{(2\pi)^3} \int d^3k_1 d^3(\Omega-\Omega_0) \quad (17)$$
$$e^{i(\vec{k}_1-\vec{k})\cdot(\vec{\Omega}-\vec{\Omega}_0)} \overleftrightarrow{g^d}(\vec{k}_1, \omega) \cdot \overleftrightarrow{g_0^{-1}}(\vec{k}_1, \omega) \cdot$$
$$(\overleftrightarrow{\tilde{g}}(\vec{k}_1, \omega) - \overleftrightarrow{g_0}(\vec{k}_1, \omega)) \cdot \overleftrightarrow{g^{-1}}(\vec{k}_1, \omega) \cdot \overleftrightarrow{g'}(\vec{k}_1, \omega)$$
$$= \overleftrightarrow{g^d}(\vec{k}, \omega) + \int d^3k_1 \delta^3(\vec{k} - \vec{k}_1) \overleftrightarrow{g^d}(\vec{k}_1, \omega) \cdot$$
$$\overleftrightarrow{g_0^{-1}}(\vec{k}_1, \omega) \cdot (\overleftrightarrow{\tilde{g}}(\vec{k}_1, \omega) - \overleftrightarrow{g_1}(\vec{k}_3, \omega)) \cdot$$
$$\overleftrightarrow{g^{-1}}(\vec{k}_1, \omega) \cdot \overleftrightarrow{g'}(\vec{k}_1, \omega)$$

or $$\overleftrightarrow{g'}(\vec{k}, \omega) = \overleftrightarrow{g^d}(\vec{k}, \omega) +$$
$$\overleftrightarrow{g^d}(\vec{k}, \omega) \cdot \overleftrightarrow{g_0^{-1}}(\vec{k}, \omega) \cdot (\overleftrightarrow{\tilde{g}}(\vec{k}, \omega) - \overleftrightarrow{g_0}(\vec{k}, \omega)) \cdot \overleftrightarrow{g^{-1}}(\vec{k}, \omega) \cdot \overleftrightarrow{g'}(\vec{k}, \omega)$$

Equation (17) is a simple, albeit implicit, relationship in the spatial Fourier domain between the Green function that can be measured in the field, $\overleftrightarrow{\tilde{g}}(\vec{k}, \omega)$, its inverse, $\overleftrightarrow{\tilde{g}^{-1}}(\vec{k}, \omega)$, the desired Green function, $\overleftrightarrow{g'}(\vec{k}, \omega)$, and calculable quantities: the water-only Green function, $\overleftrightarrow{g_0}(\vec{k}, \omega)$, the air-water Green function, $\overleftrightarrow{g^d}(\vec{k}, \omega)$, and its inverse, $\overleftrightarrow{g_0^{-1}}(\vec{k}, \omega)$. Noting that $\overleftrightarrow{g'}(\vec{k}, \omega)$ appears on both sides of equation (17), that equation can approximately (and explicitly) be solved as $$\overleftrightarrow{g'}(\vec{k}, \omega) \approx \overleftrightarrow{g^d}(\vec{k}, \omega) + \overleftrightarrow{g^d}(\vec{k}, \omega) \cdot \overleftrightarrow{g_0^{-1}}(\vec{k}, \omega) \cdot (\overleftrightarrow{\tilde{g}}(\vec{k}, \omega) - \overleftrightarrow{g_0}(\vec{k}, \omega)) \cdot \overleftrightarrow{g^{-1}}(\vec{k}, \omega) \cdot \overleftrightarrow{g^d}(\vec{k}, \omega) \quad (18)$$

Taking the inverse Fourier transform of $\overleftrightarrow{g'}(\vec{k}, \omega)$ and applying the result to the known source current density by means of equation (6) gives the desired electric field data $\vec{E}'$.

It may be noted how different the present invention is from existing methods of suppressing air-wave noise. Lu (WO 05/010560) requires the development of an approximate earth conductivity model, or $\kappa^2$ in the terminology of equation (1). Once this model is known, Lu determines $\kappa'^2$ and computes synthetic values for the fields $\vec{E}$ and $\vec{E}'$. Finally, Lu subtracts the synthesized value of $\vec{E} - \vec{E}'$ from the data to approximate the data that would have been acquired had the seawater been infinitely deep. By contrast, the present invention avoids determining κ² and thereby avoids errors that would appear because of uncertainties in the seafloor sediment conductivities.

Amundsen (WO 03/100467) likewise avoids determining κ² but requires measurements of both electric and magnetic field values at the receiver locations. By contrast, the present invention can be applied separately to magnetic and electric field measurements but does not require knowledge of both. Amundsen furthermore approximates air-wave-free data by upcoming data, an approximation that is avoided in the present invention.

Figure 12:
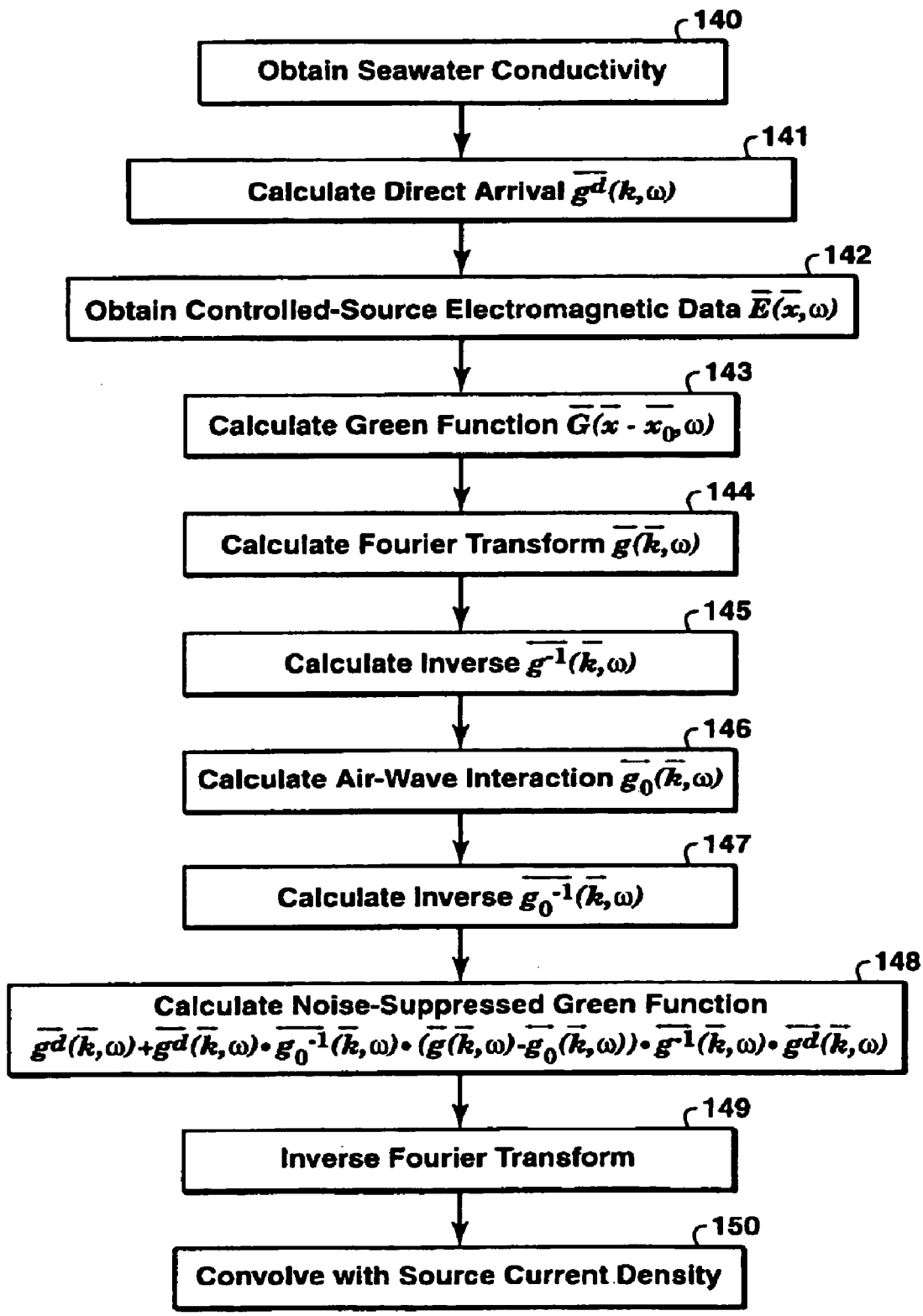
FIG. 12 is a flowchart showing basic steps in one embodiment of the invention.

FIG. 12 is a flowchart showing basic steps in one embodiment of the invention. The positions and orientations of the sources and receivers are typically measured while acquiring the data and are therefore presumed to be known. Likewise, the depth to the seafloor is typically measured using standard techniques. The reduction of the data to the temporal frequency domain was discussed earlier.

The seawater conductivity is obtained at step 140, preferably (but not necessarily) by direct sampling using a sonde. Possible alternatives to direct sampling include performing one-dimensional inversion of the CSEM data to obtain an estimate of the conductivity (see, for example, Mittet, et al., "Inversion of SBL Data Acquired in Shallow Waters," paper E020, 66th Annual Conference and Exhibition, European Association of Geoscientists and Engineers, Paris, Jun. 7-10, 2004), or one may simply assume a conductivity value in the neighborhood of 3.3 $(\Omega\text{-m})^{-1}$.

The various quantities in the right hand side of equation (18) are calculated in steps 141-147. At step 141, the direct arrival (water only) Green function $\leftrightarrow(\vec{k},\omega)$ is calculated. The direct arrival in both actual coordinates and in the spatial Fourier domain 141 is the known solution of Maxwell's equations in a uniform conductive material (see, for example, Ward et al., op. cit., p. 181).

At step 142, CSEM survey data are obtained, i.e., the output of the geophysical survey to be analyzed, which is believed to be contaminated with air wave noise because of the shallow water depths or other indications. In the most preferable embodiments of the invention, these data are obtained for both horizontal and vertical sources using vertical receiver antennae and using horizontal receiver antennae that are collinear with the horizontal source antenna. Also preferably, these data would be obtained over a large, two-dimensional area of the seafloor. In practical applications, the amount of data may be limited firstly to horizontal sources and secondly to receivers arrayed along a line collinear with the source antenna.

At step 143, the Green function for the air-water-sediment system is obtained by scaling the data by $4\pi/i\omega\mu J$, where J is the magnitude of the source current density. (See equation (3).) In practical applications, where the survey geometry may vary and the number of receiver locations is typically much less than the number of source locations, it may be desirable to invoke reciprocity to supply all of the vector components and offset values indicated by equations (16) and (18). Reciprocity (Morse and Feshbach, Methods of Theoretical Physics, McGraw-Hill, vol. 2, p. 1770 (1953)) is the observation that the value of the electric field is unchanged whether it is measured with the receiver antenna from current injected in the source antenna or measured with the source antenna from current injected in the receiver antenna. For example, data from a first, x-oriented source recorded by a first, z-oriented receiver could equally well have resulted from exciting a second, z-oriented source at the location of the first receiver and recording with a second, x-oriented receiver at the location of the first source.

The Green function in the spatial Fourier domain 144 is found by Fourier transforming the measured data, i.e., the Green function from step 143, with respect to source-receiver offset. Ideally, these offsets would cover the seafloor in two dimensions but, more typically, are restricted to a single line in that plane. By analyzing (in certain embodiments of the invention) common-receivers gathers (having invoked reciprocity), many transmitter offsets are typically available and the offset sampling is sufficient to calculate the Fourier transform by, in particular, known methods such as the Fast Fourier Transform.

The inverse of the Green function from step 144 may be found in step 145 quite literally by taking the reciprocal of the Green function taken individually at each value of k, the Fourier-transform variable. Preferably, multiple vector components are available and this reciprocal is the matrix inverse. In some applications, where only one data component is available, it may be the reciprocal of a scalar number. It should be noted that this inverse is characteristic both of the data and, through its dependence on the Fourier transform variable k, of the region over which the data were acquired and transformed. Although the inverse Green function can, in principle, be computed in physical space (most typically, offset), there it would correspond to an inverse convolution operator (that is, to a deconvolution operator) over the spatial variables. Such deconvolution are awkward to compute and apply numerically. It is an advantage of preferred embodiments of the present invention that the inverse Green functions can be computed easily in the domain of the spatial Fourier coordinate, k.

The air-water interaction Green function $\leftrightarrow(\vec{k},\omega)$ is calculated at step 146. It does not have such a simple form as the direct Green function, but nonetheless may be calculated by known methods (see, for example, Ward et al., op. cit., pp. 203 ff). Computing the Fourier-domain representation directly is less time-consuming than first computing the Green function in physical space and then Fourier transforming it.

As with the inverse data Green function in step 145, the inverse air-water Green function $\leftrightarrow(\vec{k},\omega)$ may be calculated at step 147 as either the matrix or scalar inverse of the air-water Green function 146, depending on the amount of data measured in the survey.

The desired noise-suppressed Green function $\leftrightarrow(\vec{k},\omega)$ can now be computed at step 148 in the Fourier domain by evaluating equation (18). Physically, equation (18) states that electromagnetic wave propagation through the water-sediment system is approximately equal to direct propagation through the seawater plus, reading from right to left:

Propagation through the seawater, followed by

Inverse propagation through the air-water-sediment system (that is, removal of the air-water-sediment interaction), followed by Interaction with the difference between the air-water-sediment and air-water systems (that is, interaction with the sediments), followed by Removal of the air-water interaction, followed by Propagation through the seawater.

The desired noise-suppressed data are obtained at step 149 by inverting the Fourier transform and reinstating the source current density and appropriate factors $i\omega\mu J/4\pi$ (step 150). In practical applications, reciprocity will often be invoked a second time to view the data as common-receiver gathers instead of the common source gathers suggested by equation (3).

Figure 13A:
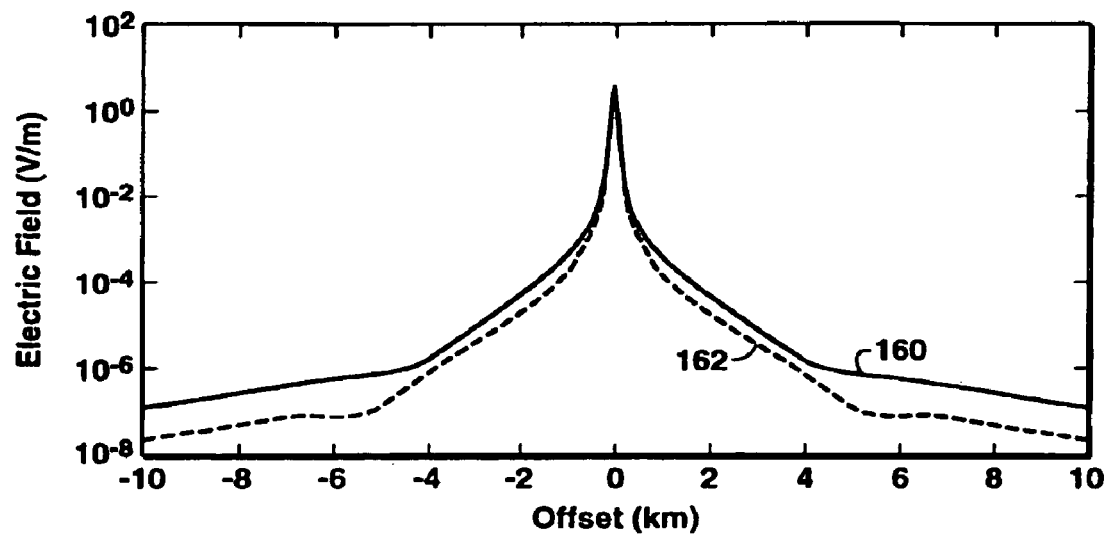
FIGS. 13A and 13B are plots of electric field amplitude (13A) and phase (13B) comparing the present inventive method to uncorrected synthetic data.
Figure 13B:
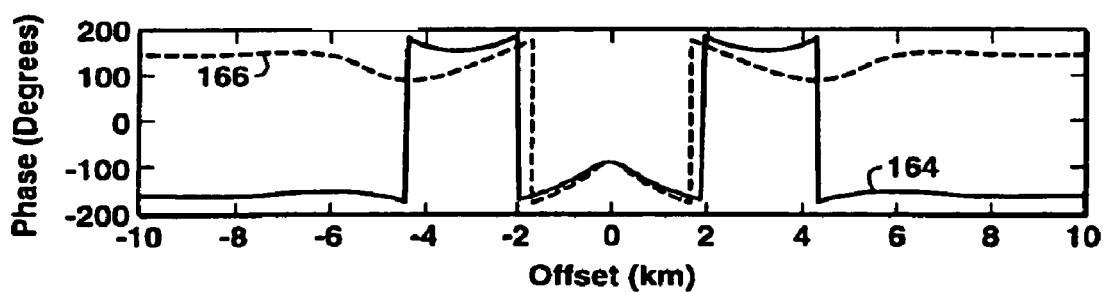

An example is shown in FIGS. 13A-B. The solid black curves are synthetic data representing the amplitude 160 and phase 164 of the horizontal component of the electric field as it would be measured under the conditions of FIG. 8. Specifically, the water layer is 200 meters thick and separates the sediments from a layer of air that extends infinitely upward. The sharp change in slope of the amplitude and the flat phase response at offsets greater than about 4 km are characteristics of the air-wave noise present in these simulated data. The dashed curves are the result of applying the present inventive method, e.g., the steps of FIG. 14 and equation (18), to approximate the amplitude 162 and phase 166 data that would have been acquired under the conditions of FIG. 10, where the air layer is absent and the water layer extends infinitely upward. The decreased amplitude relative to the amplitude 160 is consistent with the physical effect of the resistive air layer to reflect electromagnetic signals back into the subsurface. The break in slope of the amplitude 162 and the flat phase response 166 at offsets greater than about 5.5 km indicates that these data contain residual air-wave noise, likely due to the approximate nature of the simplification from equation (17) to equation (18). The noise reduction from curve 160 to curve 162 suggests that the present inventive method would be able to resolve a reservoir layer if one were introduced into the resistivity model. Likewise, the region of flat phase response in the noise-suppressed curve 166 begins at larger offsets than in the unprocessed curve 164 suggesting that the phase response of a reservoir layer could be better observed following application of the invention.

Various numerical techniques and approximations exist in different embodiments of the invention that may be practical implementations of the invention, depending upon the application. Some of these techniques and approximations are discussed in the following paragraphs.

The spatial Fourier and inverse Fourier transforms are readily performed by means of computer programs as described, for example; in Press, Teukolsky, Vetterling, and Flannery, *Numerical Recipes in Fortran,* 2nd ed., Cambridge University Press, chapter 12 (1992). Commercial software packages implementing the Fourier and inverse Fourier transforms are also available that carry out the transforms by means of the Fast Fourier Transform or by convolutions.

It will be recognized by those skilled in the art of electromagnetic exploration that the measurement surfaces referred to in equations (12), (13), (14), and (15), i.e. the surfaces signified by $\Omega_0$ and $\Omega$, are to be thought of as surfaces in a very general sense. Specifically, these "surfaces" may be straight lines, meandering lines, or planar, possibly undulating, surfaces consisting of source-receiver offsets in the range of ±10 km or, more generally, offsets in the range of ±20 km. These generalized surfaces will be necessarily limited in extent due to the limited number of source and receiver locations occupied during the CSEM survey. Depending upon the way the receivers are constructed, it may be necessary to supply an estimate of the near-offset data that is lost in the saturation zone in order to accurately carry out its Fourier transform. When needed, such near-offset data, generally corresponding to offsets less than 1.5 km and most often corresponding to offsets less than 500 meters, is preferably supplied by inverting the available data to create a resistivity model of the air, water, and sediments (Mittet, op. cit.) and then forward simulating the missing near offsets.

The electric field vectors most generally have three components corresponding to the three spatial directions. These three spatial directions can be chosen in many different combinations, including the combination of vertical, horizontal but parallel to the source ("inline"), and horizontal but perpendicular to the source ("crossline"). In many situations, the crossline data components are very small relative to the other components and may be effectively ignored. The Green functions undergo a corresponding simplification by ignoring the elements due to crossline sources or to crossline receivers. Thus, the nine-component (three-by-three) matrix Green functions may often be simplified to four-component (two-by-two) matrices.

In still other situations, the electric fields and Green functions may be approximated by a single, dominant component, most typically the inline component. Thus, the vector products indicated in equations such as (18) may sometimes be reduced to scalar products of the inline components of the data and Green functions. When they can be reduced to three-by-three or two-by-two matrices, the inverse Green functions can be found by elementary methods of linear algebra.

The conversion of measured electric fields $\vec{E}(\vec{x},\omega)$ to the equivalent Green function $\leftrightarrow(\vec{x}-\vec{x}_0,\omega)$ may be carried out approximately by assuming that the current density at the source may be approximated as $\vec{J}(\vec{x},\omega)=I\vec{L}\delta^3(\vec{x}_0)$ where I is the source current and $\vec{L}$ is the length and direction of the source antenna. As a result, the Green function at step 143 may be obtained by multiplying measured data by $4\pi/i\omega\mu IL$.

It will be clear to those skilled in the art of electromagnetic exploration how the method may be generalized to magnetic fields since these obey well known equations analogous to equations (1), (2), and (3).

It will also be clear to those skilled in the art that electromagnetic sources necessarily generate both electric and magnetic fields but that linear antennae are typically known as electric antennae by virtue of their efficiency at generating electric fields while loop antennae are typically known as magnetic antennae because of their efficiency at generating magnetic fields. It is understood that the method may be applied to either loop-type or to linear source antennae by exploiting the current densities and Green functions appropriate to either type.

It will further be clear to those skilled in the art how the reciprocity principle (Morse and Feshbach, loc. cit., U.S. patent application 60/780,232 by Carazzone et al.) may be exploited to supply offsets Green function elements needed to carry out the various Fourier Transform and inverse Transform steps that are part of this invention. Thus, although marine CSEM surveys are typically acquired for many source locations (a thousand or more) and a relatively small number of receiver locations (less than a hundred), data from each common-receiver gather may equally be regarded as data from a common-source gather whenever a Fourier integral must be carried out over a range of receiver locations from a common source.

The foregoing application is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims.

The invention claimed is:

1. A method for correcting electromagnetic field data from a controlled source electromagnetic survey of a subterranean underwater region to reduce air wave noise in signals measured at survey receivers located in the water layer at or near the water bottom, said method comprising:

(a) obtaining at least one conductivity or resistivity value for the water;

(b) using a computer to simulate synthetic electromagnetic field data for at least one selected survey receiver location assuming an all-water earth model based on the survey region except with air and below-water layers replaced by more water, using survey source locations associated with the selected receiver locations and source signal generating parameters and the at least one water conductivity or resistivity value;

(c) using a computer to simulate synthetic electromagnetic field data for the selected survey receiver locations assuming an air-water earth model based on the survey region except with more water replacing below-water-bottom sediment, using survey source locations associated with the selected receiver locations and source signal generating parameters and the at least one water conductivity or resistivity value; and (d) calculating electromagnetic field values corresponding to a hypothetical water-sediment earth model based on the survey region except with more water replacing an air half space, said calculation using measured survey electromagnetic data and synthetic data from the all-water model and the air-water model, wherein said calculated electromagnetic field values represent measured data adjusted to remove air wave noise.

2. The method of claim 1, wherein the measured survey electromagnetic field data is converted to the temporal frequency domain by Fourier transformation, and all simulations are performed in the temporal frequency domain.

3. The method of claim 2, wherein said simulations and calculations are performed using tensor Green functions whose matrix elements correspond to vector electromagnetic field components and the source's vector current density components.

4. The method of claim 3, wherein the survey data are electric field measurements and the elements of the corresponding Green function are electric field values corresponding to different source transmitter orientations, normalized by current density and frequency.

5. The method of claim 4, wherein simulated electric fields are computed as solutions to $$\nabla \times \nabla \times \vec{E}(\vec{x},\omega) + \kappa^2 \vec{E}(\vec{x},\omega) = -i\omega\mu \vec{J}(\vec{x},\omega)$$

where $\vec{E}(\vec{x},\omega)$ is the electric field at location $\vec{x}$ and angular frequency $\omega$, $\vec{J}$ is current density at the transmitter, $\mu$ is magnetic permeability, and $\kappa^2$ is determined from a conductivity model assumed for the solution.

6. The method of claim 5, wherein the electric field solution and its corresponding Green function $\overleftrightarrow{G}$ are related by $$\vec{E}(\vec{x},\omega) = \frac{i\omega\mu}{4\pi} \int d^3 x_0 \overleftrightarrow{G}(\vec{x}-\vec{x_0},\omega) \cdot \vec{J}(\vec{x_0},\omega).$$

7. The method of claim 4, wherein said simulations result in a Green function $\overleftrightarrow{g}$ and its inverse Green function $\overleftrightarrow{g}^{-1}$ for each of the all-water model and the air-water model.

8. The method of claim 7, wherein the Green function $\overleftrightarrow{G}^d$ for the all-water model is found by solving $$\nabla \times \nabla \times \overleftrightarrow{G}^d(\vec{x}-\vec{x_0},\omega) + \kappa_w^2 \overleftrightarrow{G}^d(\vec{x}-\vec{x_0},\omega) = -4\pi \overleftrightarrow{I} \delta^3(\vec{x}-\vec{x_0})$$

where $\kappa_w^2 = i\omega\mu\sigma_w$, $\sigma_w$ is the conductivity of water, $\mu$ is magnetic permeability, $\omega$ is angular frequency and $\overleftrightarrow{I}$ is an identity matrix.

9. The method of claim 7, wherein the Green function $\overleftrightarrow{G_0}$ for the air-water model is found by solving $$\nabla \times \nabla \times \overleftrightarrow{G_0}(\vec{x}-\vec{x_0},\omega) + \kappa_0^2 \overleftrightarrow{G_0}(\vec{x}-\vec{x_0},\omega) = -4\pi \overleftrightarrow{I} \delta^3(\vec{x}-\vec{x_0})$$

where $\kappa_0^2$ is determined by water and air conductivities, $\omega$ is angular frequency and $\overleftrightarrow{I}$ is an identity matrix.

10. The method of claim 7, wherein a Green function $\overleftrightarrow{g'}(\vec{k},\omega)$ for the water-sediment model in the spatial and temporal frequency domain is found by solving the equation $$\overleftrightarrow{g'}(\vec{k},\omega) \approx$$
$$\overleftrightarrow{g^d}(\vec{k},\omega) + \overleftrightarrow{g^d}(\vec{k},\omega) \cdot \overleftrightarrow{g_0}^{-1}(\vec{k},\omega) \cdot (\overleftrightarrow{g}(\vec{k},\omega) - \overleftrightarrow{g_0}(\vec{k},\omega)) \cdot \overleftrightarrow{g}^{-1}(\vec{k},\omega) \cdot \overleftrightarrow{g'}(\vec{k},\omega)$$

where $\overleftrightarrow{g'}(\vec{k},\omega)$ is the Green function corresponding to measured data after Fourier transformation from the temporal frequency domain $(\vec{x},\omega)$ into the spatial and temporal $(\vec{k},\omega)$ frequency domain by $$\overleftrightarrow{g'}(\vec{k},\omega) = \int d^3(\vec{\Omega}-\vec{\Omega_0}) \overleftrightarrow{G'}(\vec{\Omega}-\vec{\Omega_0},\omega) e^{-i\vec{k}\cdot(\vec{\Omega}-\vec{\Omega_0})}$$

and $\overleftrightarrow{g}^{-1}(\vec{k},\omega)$ is its inverse, $\overleftrightarrow{g^d}(\vec{k},\omega)$ is the Green function for the all-water model, $\overleftrightarrow{g_0}(\vec{k},\omega)$ is the Green function for the air-water model and $\overleftrightarrow{g_0}^{-1}(\vec{k},\omega)$ is its inverse, all Green functions denoted by a lower case $\overleftrightarrow{g}$ being similarly transformed from the $(\vec{x},\omega)$ domain where upper case $\overleftrightarrow{G}$ denotes a Green function into the spatial and temporal $(\vec{k},\omega)$ frequency domain where the corresponding Green function is denoted by lower case $\overleftrightarrow{g}$, and wherein $\vec{\Omega_0}$ and $\vec{\Omega}$ are selected regions in space containing, respectively, source and receiver locations.

11. The method of claim 10, wherein the solution to the equation is approximated by $$\overleftrightarrow{g'}(\vec{k},\omega) \approx$$
$$\overleftrightarrow{g^d}(\vec{k},\omega) + \overleftrightarrow{g^d}(\vec{k},\omega) \cdot \overleftrightarrow{g_0}^{-1}(\vec{k},\omega) \cdot (\overleftrightarrow{g}(\vec{k},\omega) - \overleftrightarrow{g_0}(\vec{k},\omega)) \cdot \overleftrightarrow{g}^{-1}(\vec{k},\omega) \cdot \overleftrightarrow{g^d}(\vec{k},\omega).$$

12. The method of claim 11, wherein the calculated electric field values with air wave noise removed $\vec{E}'$ are obtained by taking the inverse Fourier transform of $\overleftrightarrow{g'}(\vec{k},\omega)$ $$\overleftrightarrow{G'}(\vec{\Omega}-\vec{\Omega_0},\omega) = \frac{1}{(2\pi)^3}\int d^3k\, \overleftrightarrow{g'}(\vec{k},\omega)e^{i\vec{k}\cdot(\vec{\Omega}-\vec{\Omega_0})}$$

and applying the result to known source current density using $$\vec{E'}(\vec{x},\omega) = \frac{i\omega\mu}{4\pi}\int d^3x_0\, \overleftrightarrow{G'}(\vec{x}-\vec{x_0},\omega)\cdot\vec{J}(\vec{x_0},\omega).$$

13. A method for producing hydrocarbons from a subterranean region covered by water, comprising:
  (a) performing a controlled-source electromagnetic survey above the subterranean region;
  (b) obtaining processed results of the survey, wherein airwave noise has been reduced by:
    (i) obtaining at least one conductivity or resistivity value for the water;
    (ii) simulating synthetic electromagnetic field data for at least one selected survey receiver location assuming an all-water earth model based on the survey region except with air and below-water layers replaced by more water, using survey source locations associated with the selected receiver locations and source signal generating parameters and the at least one water conductivity or resistivity value;
    (iii) simulating synthetic electromagnetic field data for the selected survey receiver locations assuming an air-water earth model based on the survey region except with more water replacing below-water-bottom sediment, using survey source locations associated with the selected receiver locations and source signal generating parameters and the at least one water conductivity or resistivity value; and
    (iv) calculating electromagnetic field values corresponding to a hypothetical water-sediment earth model based on the survey region except with more water replacing an air half space, said calculation using measured survey electromagnetic data and synthetic data from the all-water model and the air-water model, wherein said calculated electromagnetic field values represent measured data adjusted to remove air wave noise; and
  (c) drilling at least one well into the subsurface region based at least in part on indications of a resistivity anomaly in the adjusted electromagnetic survey results; and
  (d) producing hydrocarbons from the at least one well.

* * * * *